(12) United States Patent
Blazek et al.

(10) Patent No.: US 10,380,079 B1
(45) Date of Patent: Aug. 13, 2019

(54) INFORMATION TECHNOLOGY CONFIGURATION MANAGEMENT

(71) Applicant: United Services Automobile Association (USAA), San Antonio, TX (US)

(72) Inventors: Mark C. Blazek, Helotes, TX (US); Richard C. Gonzalez, San Antonio, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 1 day.

(21) Appl. No.: 14/199,600

(22) Filed: Mar. 6, 2014

Related U.S. Application Data (63) Continuation of application No. 13/302,141, filed on Nov. 22, 2011, now Pat. No. 8,706,682, which is a continuation of application No. 13/011,494, filed on Jan. 21, 2011, now Pat. No. 8,065,263, which is a continuation of application No. 11/321,307, filed on Dec. 29, 2005, now Pat. No. 7,949,628.

(51) Int. Cl.
*G06F 16/00* (2019.01)
*G06F 16/21* (2019.01)

(52) U.S. Cl.
CPC .................... *G06F 16/21* (2019.01)

(58) Field of Classification Search
CPC combination set(s) only.
See application file for complete search history.

(56) References Cited

U.S. PATENT DOCUMENTS

| | | | |
|---|---|---|---|
| 5,446,575 A * | 8/1995 | Lysakowski, Jr. | G06F 17/30569 |
| 5,872,928 A * | 2/1999 | Lewis | H04L 41/0843 709/221 |
| 6,243,747 B1 * | 6/2001 | Lewis | H04L 41/0843 709/220 |
| 6,421,719 B1 * | 7/2002 | Lewis | G06F 21/30 709/220 |
| 6,694,362 B1 * | 2/2004 | Secor | G06Q 10/087 705/28 |
| 6,735,691 B1 * | 5/2004 | Capps | G06F 9/44505 713/1 |

(Continued)

OTHER PUBLICATIONS

Muehlen et al., "Workflow-based Process Monitoring and Controlling—Technical and Organizational Issues", Proceedings of the 33rd Hawaii International Conference on System Sciences, pp. 1-10, 2000, IEEE.*

(Continued)

*Primary Examiner* — Farhan M Syed
(74) *Attorney, Agent, or Firm* — Baker & Hostetler LLP (57) ABSTRACT

The described embodiments contemplate a system, method and computer-readable medium with computer-executable instructions for managing an information technology network. The novel system includes a network of data sources and a federated configuration management database capable of communicating with the data sources. The data sources also may be federated. The federated configuration database management identifies among the data sources. The system also includes a core database that is capable of communicating with the federated configuration management database. The core database defines relationships of the data sources with a business practice.

19 Claims, 6 Drawing Sheets

(56) References Cited

U.S. PATENT DOCUMENTS

| | | | | |
|---|---|---|---|---|
| 6,876,993 | B2* | 4/2005 | LaButte | G06Q 10/06 706/47 |
| 7,590,669 | B2* | 9/2009 | Yip | H04L 41/0816 |
| 8,185,550 | B1* | 5/2012 | Eichler | G06F 11/0709 707/783 |
| 8,190,601 | B2* | 5/2012 | Ahari | G06F 7/00 707/722 |
| 8,572,074 | B2* | 10/2013 | Ahari | G06F 7/00 707/722 |
| 8,577,913 | B1* | 11/2013 | Hansson | G06F 3/048 707/767 |
| 8,819,000 | B1* | 8/2014 | Acharya | G06F 16/00 707/723 |
| 8,930,338 | B2* | 1/2015 | Velipasaoglu | G06F 16/00 707/706 |
| 2004/0237077 | A1* | 11/2004 | Cole et al. | 717/162 |
| 2005/0223109 | A1* | 10/2005 | Mamou | G06F 17/30563 709/232 |
| 2005/0228808 | A1* | 10/2005 | Mamou | G06F 17/30563 |
| 2006/0004875 | A1* | 1/2006 | Baron | G06Q 10/06 |
| 2006/0026176 | A1* | 2/2006 | Dettinger et al. | 707/100 |
| 2010/0115100 | A1* | 5/2010 | Tubman | G06F 17/30545 709/227 |
| 2010/0299343 | A1* | 11/2010 | Ahari | G06F 7/00 707/759 |
| 2011/0191321 | A1* | 8/2011 | Gade | G06F 12/08 707/709 |
| 2011/0218960 | A1* | 9/2011 | Hatami-Hanza | G06F 16/00 707/603 |
| 2012/0209835 | A1* | 8/2012 | Ahari | G06F 7/00 707/723 |
| 2012/0296927 | A1* | 11/2012 | Velipasaoglu | G06F 16/00 707/768 |
| 2014/0025664 | A1* | 1/2014 | Ahari | G06F 7/00 707/722 |
| 2014/0304122 | A1* | 10/2014 | Rhoads | G06Q 30/0643 705/27.2 |
| 2015/0088806 | A1* | 3/2015 | Lotan | G06F 17/30557 707/602 |

OTHER PUBLICATIONS

Altiris, "CMDB Solution™ 6.5 Product Guide", 2007, Altiris.*

Oracle Inc. "Using Oracle9i SCM for Software Configuration Management", Jul. 2002, Retrieved from the Internet: <http://www.oracle.com/technology/products/repository/pdf/ap- pdevscm9i.pdf>, pp. 1-17.*

* cited by examiner

Figure 6

INFORMATION TECHNOLOGY CONFIGURATION MANAGEMENT

CROSS REFERENCE TO RELATED APPLICATIONS

This application is a continuation of U.S. patent application Ser. No. 13/011,494, filed on Jan. 21, 2011, which is a continuation of U.S. patent application Ser. No. 11/321,307, filed Dec. 29, 2005, the specification of which is incorporated herein by reference. This application is also related in subject matter to, and incorporates herein by reference in its entirety, each of the following: U.S. patent application Ser. No. 11/321,333, filed on Dec. 29, 2005; U.S. patent application Ser. No. 11/321,335, filed on Dec. 29, 2005; and U.S. patent application Ser. No. 11/320,999, filed on Dec. 29, 2005.

BACKGROUND

Information technology (IT) support has grown from the days of merely keeping a computer network running. Today, IT serves as a backbone for an organization's entire business structure. For example, critical business processes now are operated by sophisticated computer networks and software. The execution of these critical business processes lie at the very heart of the day-to-day operations of an organization. In fact, many businesses rely on the IT to the extent that their business would cease to operate without a properly functioning IT system.

A natural consequence of this critical reliance on IT and its infrastructure has been an increased focus on IT monitoring and support services. The Capability Maturity Model (CMM) is a methodology that originally was developed to manage an organization's software development process. Its concepts also have been expanded to hardware management. The CMM model describes an evolutionary path of increasingly organized and systematically more mature processes designed to refine and optimize the IT development process. While CMM addresses software development maturity, another framework called IT Infrastructure Library (ITIL) provided for operating infrastructure to support delivered software assets. ITIL processes help facilitate the implementation of a framework for IT service management. The ITIL framework allows for the creation of an IT service management structure that is customizable to the specific operation of a business that relies on an IT infrastructure.

ITIL has allowed for integration and communication among various IT systems that previously were isolated from each other. As a result, ITIL permits easier determination of the overall business impact of a particular hardware component or software application. For example, ITIL facilitates which departments in an organization or which services provided by an organization will be adversely impacted should a particular database server fail. Also, by quantifying the interrelationships among the various components or "configurable items" of an IT system, ITIL allows an IT system administrator to properly plan for additions and/or modifications to the IT system.

Yet, while ITIL provides these advantages, the integration of the operating infrastructure's configurable items to the organization's defined business processes remains elusive. Of course, an organizations business processes may be as varied and specific as the very business itself. As a result, in practice it is often difficult to trend incidents that occur on the network and identify a root cause of a particular problem. Therefore, there is a need to provide techniques that embrace an organization's particular business attributes, while conforming to accepted process frameworks and methodologies. It should be appreciated that the term network may be used to include a system environment, operating environment, and/or operating infrastructure.

SUMMARY

The described embodiments contemplate a system, method and computer-readable medium with computer-executable instructions for managing an information technology network. The novel system includes a network of data sources and a federated configuration management database capable of communicating with the data sources. The data sources also may be federated. The federated configuration database management identifies among the data sources. The system also includes a core database that is capable of communicating with the federated configuration management database. The core database defines relationships of the data sources with a business practice.

The novel method includes collecting information from data sources, determining relationships among the data sources, and identifying relationships of the data sources to a business process. The method may also include identifying a business process impacted by a modification to the data source. Such a modification may include adding a new data source, changing a data source, upgrading a data source, adding a new application, adding a new server/hardware, a software change, and/or a user change. The novel method may further trend incidents and changes related to a data source, and provide a hierarchical representation of the data sources.

BRIEF DESCRIPTION OF THE DRAWINGS

The foregoing summary, as well as the following detailed description, is better understood when read in conjunction with the appended drawings. For the purpose of illustrating the claimed subject matter, there is shown in the drawings example constructions of various embodiments; however, the invention is not limited to the specific methods and instrumentalities disclosed. In the drawings:

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
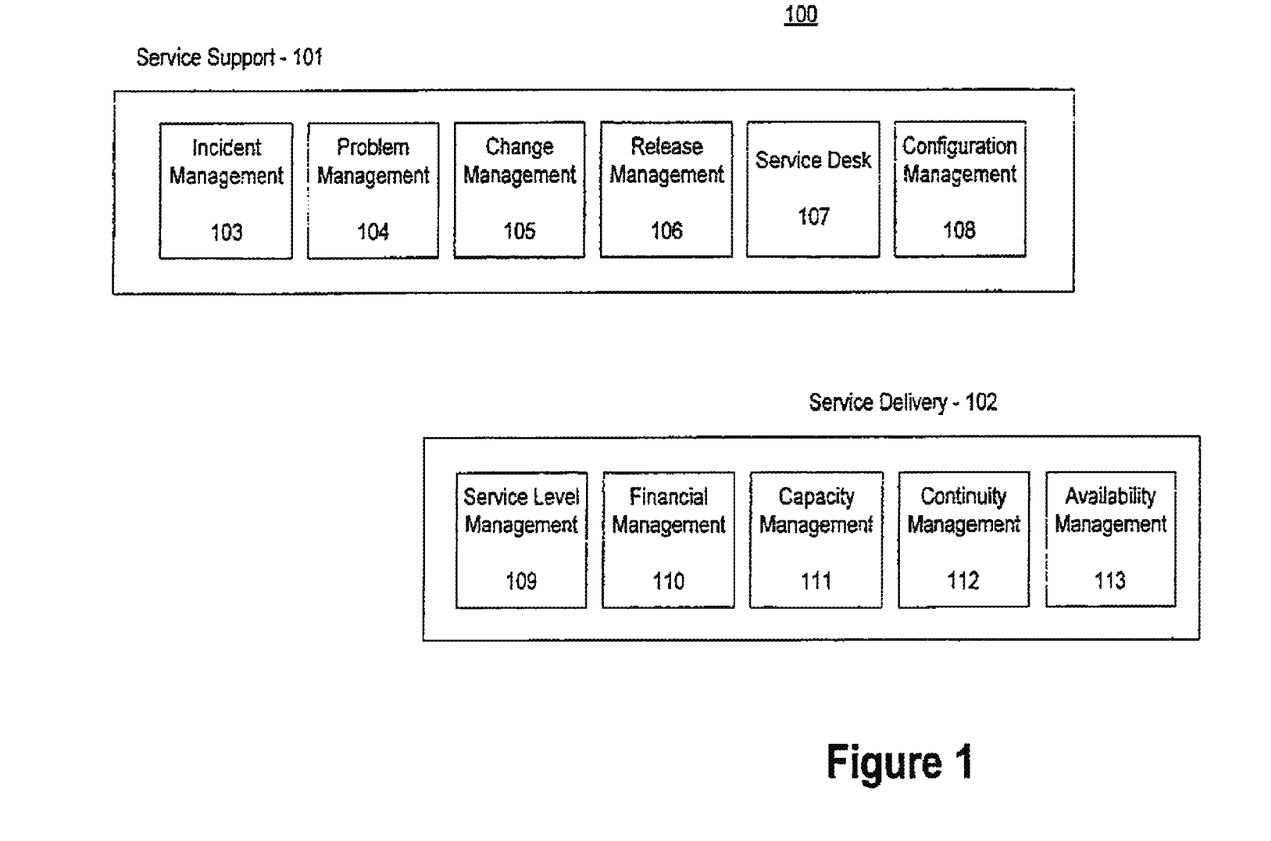
FIG. 1 is a block diagram of an IT Infrastructure Library System.

FIG. 1 is a block diagram of an ITIL infrastructure. It should be appreciated that the described embodiments are not meant to be limited to the ITIL infrastructure described with reference to FIG. 1, but may be applied beyond to other infrastructures and methodologies. The ITIL infrastructure described with reference to FIG. 1 merely provides a framework to help facilitate discussion of the described embodiments.

As shown in FIG. 1, ITIL framework 100 includes a service support component 101 and a service delivery component 102. Service support component 101 includes the following components: incident management 103, problem management 104, change management 105, release management 106, and service desk 107. Service delivery component 102 includes the following components: service level management 108, financial management 109, capacity management 110, continuity management 111, and availability management 112.

Incident management 103 involves resolution and prevention of events that affect the typical day-to-day running of an organization's IT services. For example, incident management 103 includes ensuring that faults or errors are corrected and preventing further recurrence of such faults. Also, incident management 103 may include application of certain preventative maintenance procedures designed to reduce or eliminate the likelihood of such faults or errors occurring. Similarly, problem management 104 involves providing solutions, like preventive maintenance or hardware replacement, to prevent further incidents from occurring.

Change management 105 involves ensuring that any changes to data sources or configuration items are both planned and authorized. A data source may be a configurable item, for example, a network hardware element, a database, a software application, an operation system, a server, an application server, a database server, and/or a file server. For example, change management 105 may include ensuring that there are verifiable business reasons behind a planned change. Also, change management 105 may identify the configuration items and IT services that may be impacted by such a change. Change management 105 also includes providing a detailed plan for the change, testing the change before or after it has been accomplished, and having a failure plan should the change create an unexpected state of the system or the configuration item.

Release management 106 typically involves management of software configuration items within an organization. For example, release management 106 provides for the management of software development, as well as the installation and technical support of an organization's existing software products. Release management 106 helps prevent, or at least monitor, the many versions of the same software application that may exist within the organization. Release management 106 also determines whether there are any unlicensed and/or illegal copies of unauthorized software.

In order to provide such software management control, release management 106 typically involves the use of a Definitive Software Library (DSL). The DSL houses master copies of the software, and serves as the central point of control from which a software release is managed. Typically, the DSL consists of a physical store and a logical store. The physical store provides a location for the master copies of each software application. The physical store typically houses software from an external source. The logical store provides an index of the software releases and versions, and provides a point to where the physical media is located. The logical store also typically is used for the storage of software that is developed from within the organization.

Release management 106 also typically involves consideration of certain defined procedures that include distribution and implementation of configuration items into a production environment. For example, this may involve defining a release program suitable for the organization, as well as defining how control of software versions may be implemented. Also, this may include developing procedures regarding how software will be built, released and audited.

Service desk 107 involves provisioning of IT services. Service desk 107 typically provides the first contact a business user has with their IT services when something does not work as expected. Service desk 107 desirably provides a single point of contact for each business user. The two primary responsibilities of service desk 107 involve incident control and communication. Some service desks provide a basic call logging function and escalate calls to more experienced and trained IT services staff, while others provide a greater business and technical knowledge with the ability to solve most incidents at the time that the business user reports them.

Configuration management 108 involves the implementation of a specialized database called "Configuration Management Database" or CMDB. The CMDB stores data relating to the organization's management of its IT services, including data that relates to the maintenance, movement, and incidents of each configuration item. The CMDB is not limited to this type of data, but also may store additional information about other types of items on which the organization's IT Services depend, including hardware, software, personnel, and documentation.

Generally, configuration management includes four tasks. The first task is called identification, which includes identifying and specifying the IT components or configuration items and including them as such in the CMDB. The second task is control, which involves the management of each particular configuration item. For example, control involves identifying and specifying which personnel are authorized to change a configuration item. The third task is called status and includes recording the status of configuration items in the CMDB, as well as maintaining this information. Finally, a verification task involves reviewing and auditing to ensure the accuracy of the information in the CMDB.

Service level management 109 often is the primary management of IT services. Service level management ensures that services are provided when and where they have been agreed to be provided. Service level management 109 typically is dependent upon the other areas of service delivery 102 in providing necessary support to ensure the agreed services are provided in a secure and efficient manner.

There may be a number of business processes that form part of service level management 109. These business processes may include negotiating with the customers and reviewing existing services. Also, service level management 109 may include producing and monitoring the service level agreement (SLA) and implementing service improvement policy and processes. Service level management 109 also may include such business processes as planning for growth in service and accounting.

Financial management 110 contemplates ensuring that the IT infrastructure is obtained at the most efficient price. Also, financial management 110 calculates the cost of providing IT services so that an organization can understand the individual costs of providing its IT services. This analysis may lead to cost recovery from the customer who specifically uses the service. Financial management 110 may divide costs into various categories, including for example, equipment, software, staff, and costs of outside providers. The costs may be divided into direct and indirect costs, and can be capital or ongoing, for example.

Capacity management 111 ensures that the IT infrastructure is provided at the correct time and in the correct amount. Capacity management 111 also ensures that IT is used in a most efficient manner. As a result, capacity management 111 may receive input from many areas of the business to identify the required services, the IT infrastructure required to support these services, the level of required contingency, and/or the cost of the infrastructure. Such inputs into capacity management 111 may include performance monitoring, workload monitoring, application sizing, resource forecasting, demand forecasting, and modeling. From these inputs and processes typically come the results of capacity management 111 that include plan capacity, business forecasts, and service level management guidelines.

Continuity management 112 represents the processes by which plans are established and managed. Continuity management 112 ensures that IT services can recover and continue in the event of a relatively more serious incident. This includes the consideration of proactive measures that reduce risk of an incident in the first instance. Continuity management 112 typically is vital to the day-to-day operations of a business.

Continuity management 112 is regarded as the recovery of the IT infrastructure used to deliver IT services. Continuity management 112 also may contemplate higher levels of continuity planning to ensure that vital business processes can continue should a serious incident occur.

Continuity management 112 may include prioritizing the business processes to be recovered by conducting an impact analysis. Continuity management 112 also may consider performing risk assessment or analysis for each of the IT services to identify the assets, threats, vulnerabilities and countermeasures for each service. Continuity management 112 may evaluate options for recovery, producing a contingency plan, as well as revising the plan on a regular basis.

Finally, availability management 113 involves identifying various levels of IT service availability for use in service level reviews, for example with customers. Areas of a service are measurable and defined within the service level agreement. The service level agreement typically includes certain aspects to help measure service availability.

For example, agreement statistics like what is included in the agreed service, and availability like agreed service times, response times, etc. Also, the service level agreement may include help desk calls, including number of incidents raised, response times, resolution times, and contingency. The service level agreement also may include agreed upon contingency details, location of documentation, contingency site, and third party involvement. The service level agreement also may include capacity, like performance timings for online transactions, report production, numbers of users, and costing details, like charges for the service, and any penalties should service levels not be met.

Availability management 113 typically is determined as a function of a model involving an availability ratio and techniques such as fault tree analysis. Such calculations may include serviceability, like where a service is provided by a third party organization, the expected availability of a component, and reliability (i.e., the time for which a component can be expected to perform under specific conditions without failure). Another example includes recoverability or the time it should take to restore a component back to its operational state after a failure. Maintainability contemplates the ease with which a component can be maintained, resilience describes an ability to withstand failure, and security contemplates the ability of components to withstand breaches of security.

IT security typically is an integral part of availability management 113. Part of availability management 113 includes performing a risk analysis to identify any resilience measures, and identifying the reliability of elements and how many problems have been caused as a result of system failure. The risk analysis also may recommend controls to improve availability of IT infrastructure, including development standards, testing, and physical security.

Figure 2:
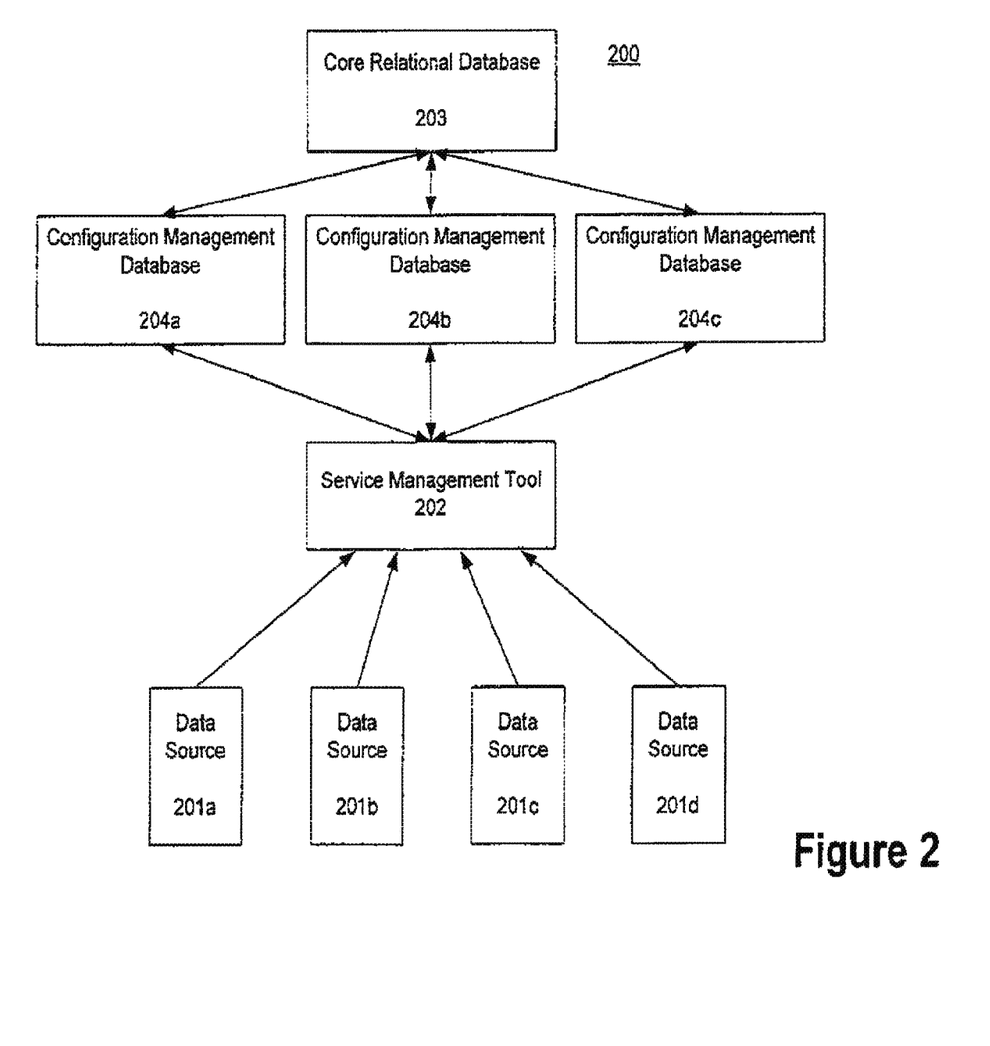
FIG. 2 provides a block diagram of a configuration management database and its related elements.

As discussed, configuration component 108 typically includes a CMDB. The CMDB includes the ability to trend incidents and/or to see what the impacts are from certain changes. FIG. 2 provides a block diagram of the CMDB and its related elements in a computer network 200. As shown in FIG. 2, computer network 200 includes one or more data sources 201. Data sources 201 may include configuration items, like software applications, hardware, personnel information, servers, network nodes, databases, third party vendor connections, and file shares for critical documentation, as well as any other elements whose characteristics may be quantified on computer network 200. Data sources 201 may be in communication with a service management tool 202. Service management tool 202 may be a business service management tool, like Formula™, developed by Managed Objects™. One or more CMDBs 204 may be in communication with service management tool 202. Also, CMDB 204 may be in communication with a core relational database 203.

Core relational database 203 may be a database structure that is customized to the particular operation of the business. Core relational database 203 may include various attributes of data sources 201. It should be appreciated that CMDBs 204 may be federated and/or distributed databases, whose relationships with each other and with various data sources 201 are identified in core relational database 203. For example, a federated version of CMDBs 204 may include certain procedures or protocols to ensure that the data can exist across multiple databases. As a result, federated configuration database management may have the capability of identifying each of the data sources independently.

One such protocol may be Extensible Markup Language (XML). XML allows the user to create customizable tags that enable data to be defined, transmitted, validated and interpreted among the distributed CMDBs 204. Other techniques may be utilized, including metadata. As a result, core relational database 203 may similarly be customized to communicate with the CMDBs 204 according to their federation techniques, and to create relationships among the data sources, which also may be considered to be federated. This may be accomplished through the creation of logical elements within each database itself to tie together the relationships.

For example, core relational database 203 may be operated to combine the federated configurable items that are in computer network 200 with various existing or new sources of information regarding the relationships of data sources 201. Also, both CMDBs 204 and core relational database 203 may have customized schema portions, or a database system structure, that allow them to communication with each other. The schema may allow each database to be able to handle various different data source types and allow sufficient flexibility and extensibility, for example, to allow each data source to register with the data sources. In a relational or federated database system, the schema also may be used to define tables, fields in each table, and the relationships between fields and tables, for example.

Core relational database 203 also may serve as a repository for interrelationships among data sources 201. These interrelationships may be assigned manually or automatically, using network-aware devices that determine relationships based on communication and interaction between data sources 201. In addition, these relationships among the various components of computer network 200 may be established using existing processes.

Also, information about data sources 201 may be provided to core relational database 203 from the data sources themselves, which may be in a federated or other configuration. For example, data source 201 may indicate to core relational database 203 such information, for example, as the number of processors on a particular computer terminal or server, the type of such processors, and the number and type of databases that are on a particular database server. Also, information may be obtained with regard to software applications on a computer terminal or server. In the examples, core relational database 203 manages the interrelations of data sources 201 among each other and with CMDB 204, for example.

In those embodiments where data sources 201 are federated or have characteristics spread among more than one source, it may be necessary to provide reconciliation for a particular data source. Reconciliation involves taking certain information related to data sources 201 from multiple sources of information and determining which of the available characteristics should be collected or additionally created. This process allows for the sum collection of information for a particular data source to be complete in terms of the requirements of the business practice or process, for example. This may be accomplished using a generational approach, well known to those skilled in the art.

Reconciliation may be accomplished during deployment or initiation of particular data sources through automated means using, for example, existing tools like Blade Logicm. Also, discovery of characteristics of data sources 201 may be conducted using automated or manual discovery of related storage devices using, for example, existing tools like Storage Scope™. Reconciliation refers to determining the data element of perhaps greatest relevancy when more than one source of that data exists from more than one collection source. This may be accomplished, for example, via an extensible markup language rule. Reconciliation allows for the combining of various attributes from multiple sources for the same data element.

Generational views may then be created for the particular to collect the desired attributes. For example, in the context of a server, a first generation may include a logical name of the server with the IP address. Second generation may include data collected, for example, from BladeLogic that gives attributes of the server's processors and local hard drives. Data may be added and/or combined with the first generation data. Also, for example, the IP address of the server may be ignored based on reconciliation rules because the first generation data may be considered definitive. Third generation may include data is collected from, an application, like EMC StorageScope for example. Such data may give information on the servers distributed storage. Although the StorageScope application may simply identify the server by it's IP address, this information may be provided via core relational database 203.

Core relational database 203 also may function to take the various components of the configuration infrastructure and manage relationships with those components as they relate to actual and identified business processes dictated by the business practice. Also, core relational database 203 may be able to use existing processes and configuration item characteristics to aggregate existing repositories of information held in independent data sources. As a result of core relational database 203, configuration management 108 and the other components of ITIL framework 100 may be capable of identifying an impact of a particular modification, change or addition of a configurable item down to the level of a business process.

Figure 3:
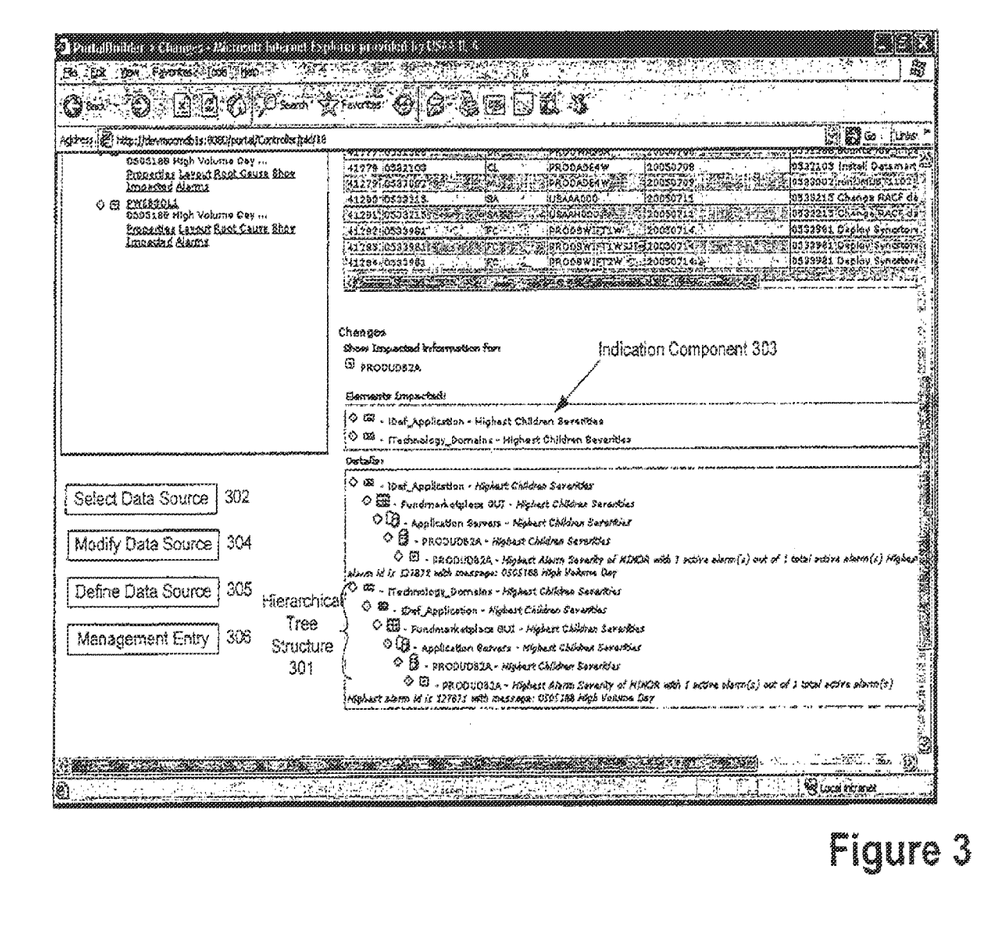
FIG. 3 provides a graphical user interface for identifying business processes that may be impacted by activity within the configuration management context.

FIG. 3 provides a graphical user interface 300 for identifying business processes that may be impacted by activity within the configuration management context. Graphical user interface 300 includes a hierarchical representation 301. Hierarchical representation 301 illustrates relationships among data sources. Graphical user interface 300 also includes an input 302 for receiving selection of a data source. Input 302 may be in communication with a user interface device, like a keyboard or mouse, for receiving the selection of the data source. Graphical user interface 300 also includes an indication component 303 for indicating the selected data source and an associated business process. Such indication may be provided to a display device so that decision can be made by a user.

As shown in FIG. 3, hierarchical representation 301 may have a tree structure, indicating a parent/child relationship. An indication component may highlight the selected data source and associated business processes, or provide some other technique (e.g., flashing or bold text) of alerting a viewer to the selected information. The highlighted information also may show the association of the data source to other data sources.

Graphical user interface 300 also may include an input or button 304 that allows a user to modify a data source. When selected, a modification screen may appear that allows the user to, for example, change a configuration of the data source, add a data source, and/or remove a data source. Graphical user interface 300 also may include an input or button 305 that allows a user to define a data source. For example, after button 305 is selected, graphical user interface 300 may allow a user to provide a name of the data source, a type of a data source, a registration date of the data source, and/or a status of the data source. Once a new item is registered in the system, it may inherit the correlation and generational building approach for its CI type. Also, additional attributes and related elements automatically may be added based on existing rules.

Graphical user interface 300 also may include an input or button 306 that allows a user to enter a management entry screen. Management entry screen may allow a user to add a relationship to the data source, delete a relationship to the data source, and/or update a relationship of the data source.

Figure 4:
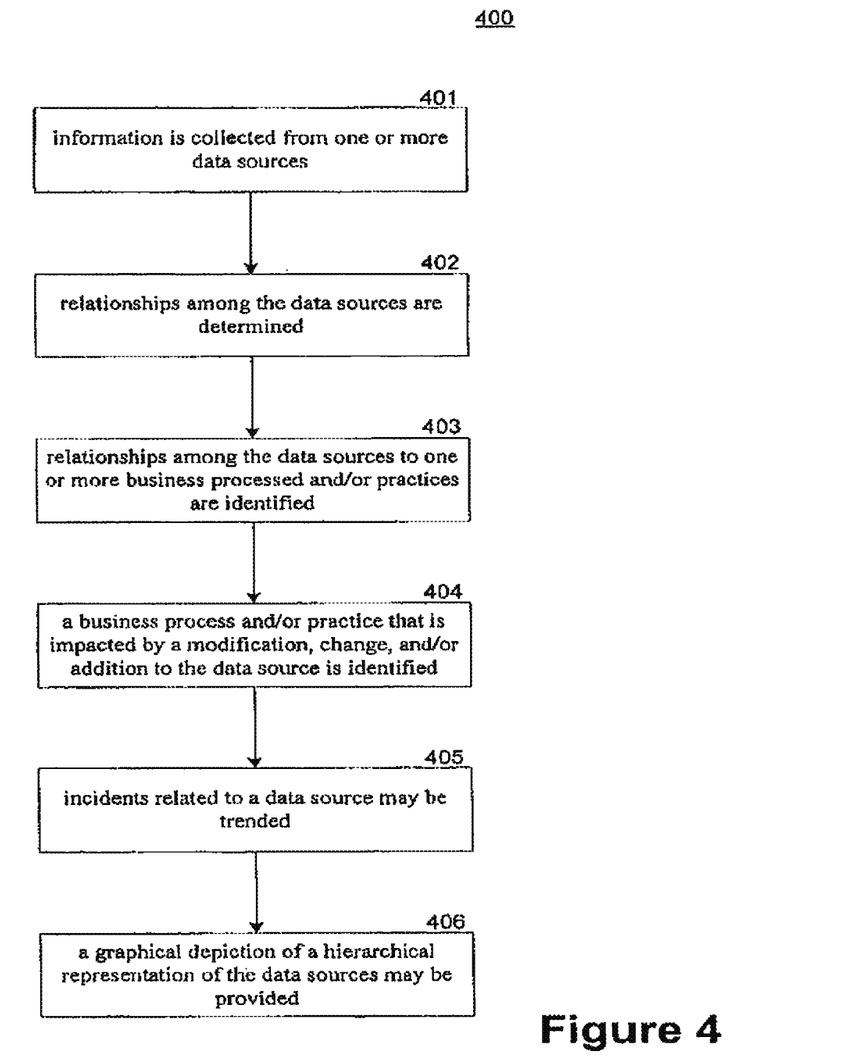
FIG. 4 provides a flow diagram of a technique for managing an information technology network.

FIG. 4 provides a flow diagram 400 of a technique for managing an information technology network, and perhaps more specifically managing a configuration of the data sources. In step 401, information is collected from one or more data sources. Such information may include, for example, the number and type of applications on a particular server or personal computer. Also, such information may be collected automatically through network discovery tool and/or manually through human data entry. In step 402, relationships among the data sources are determined. Such relationships may be based on hierarchical dependencies, such as client/server relationship. In step 403, relationships among the data sources to one or more business processes and/or practices are identified. These relationships may be manually entered and/or discovered through network interactivity. In step 404, a business process and/or practice that is impacted by a modification, change, and/or addition to the data source is identified. This may be accomplished using graphical user interface techniques that allow a user to quickly identify the problem and/or its impact on the rest of the infrastructure.

It should be appreciated that such modification may include adding a new data source, changing a data source, upgrading a data source, adding a new application, adding a new server/hardware, making a software change, and/or making a user change, for example. Also, it should be appreciated that the data source may include a personal computer, network hardware, and/or a software application, for example. In step 405, incidents related to a data source may be trended. Such trending may be useful for attending to preventive maintenance issues and/or to proactively estimate future incidents, for example. In step 406, a graphical depiction of a hierarchical representation of the data sources may be provided.

Figure 5:
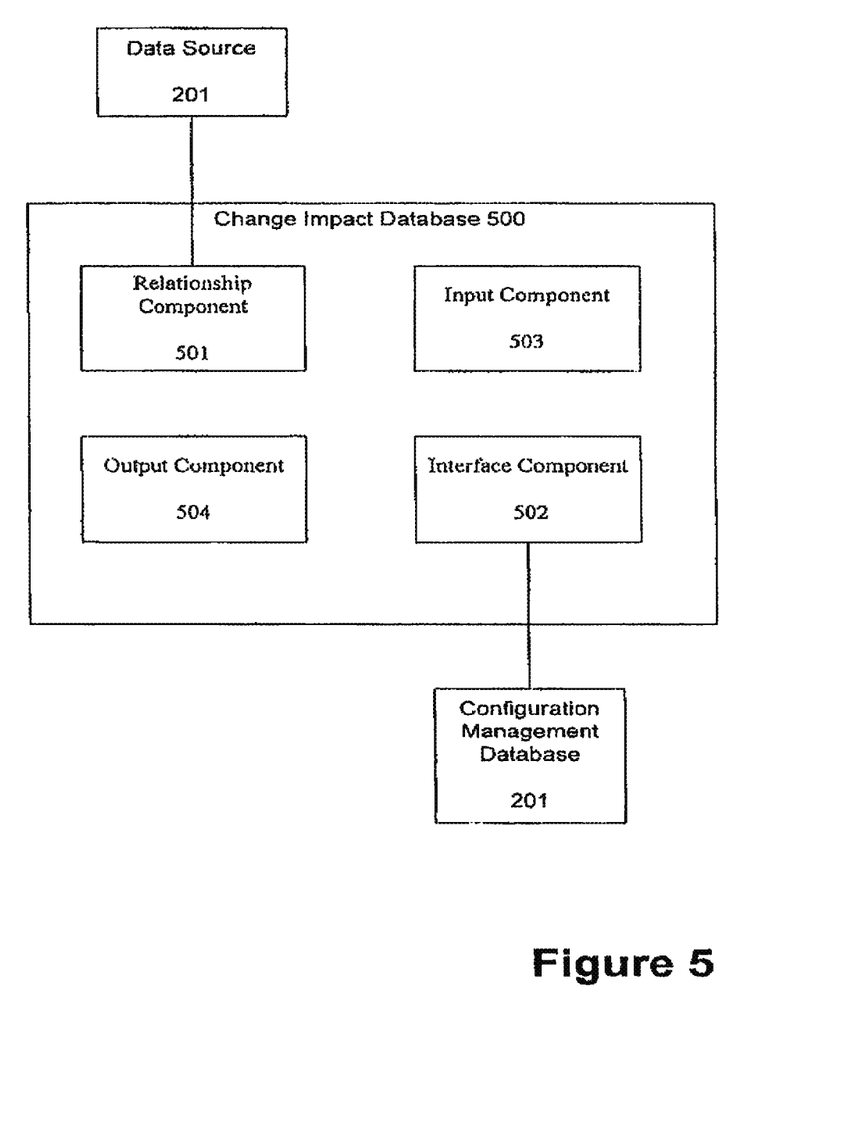
FIG. 5 provides a block diagram of a change impact database.

FIG. 5 provides a block diagram of a change impact database 500. Change impact database 500 may capture activity like changing a configuration of the data source, adding a data source, and/or removing a data source, for example. As shown in FIG. 5, change impact database 500 includes a relationship component 501 for identifying relationships among data sources. Also, relationship component 501 may identify relationships of data sources to certain business practices. Change impact database 500 also includes an interface component 502 for interfacing with a CMDB. Interface component 502 may do so using various types of protocols, including XML and metadata techniques, for example.

Change impact database 500 may include an input component 503 for receiving information related to modification of a data source. Change impact database 500 may include an output component 504. Output component 504 provides an indication of the modified data source, wherein the indication is a hierarchical depiction of the modified data source and a corresponding business process. It should be appreciated that change impact database 500 may have various characteristics, including federated, relational, and stand-alone, for example. Also, change impact database 500 may reside on a computer-readable medium that has computer-executable instructions.

There may be two types of change analysis contemplated. The first relates to evaluation of a change request. The change request may be put into a system and identified as the item that is destined for change. This system also may becomes a federated data source 201. The service management tool may read the data source and may attach a change record to the impacted CI. Because core relational database 203 understands the interrelations of the CI, an impact assessment may be accomplished. The second type of change is related to discovering unmanaged change. A snapshot or baseline image may be taken of the system infrastructure at any point in time. This baseline may include interrelations of the CIs and their relevant, collected attributes. This baseline may be stored to give an entire service configuration view for a point in time. At a later date, the same snapshot may be taken and programmatically compared to the previous baseline. Based on the comparison, alerting on any differences between the elements or their attributes may be made. Because change records may have been submitted against required changes and these records are being collected, this may provide a good source of unmanaged change.

In operation, when a data source is modified, change impact database 500 may receive information that is related to the modifying of the data source. For example, if a server is removed, or if an application is installed on a personal computer, information is sent to change impact database 500 from those data sources or from specialized software designed to accomplish such reporting. Change impact database 500 may then provide an indication of such a modification. The indication may be, for example, a hierarchical depiction of the modified data source and a corresponding business process. The hierarchical depiction facilitates human recognition of the change as well as quick recognition of the upstream and downstream impact of the change. Change impact database 500 also may trend incidents related to a data source, and may facilitate managing a configuration of the data sources.

Figure 6:
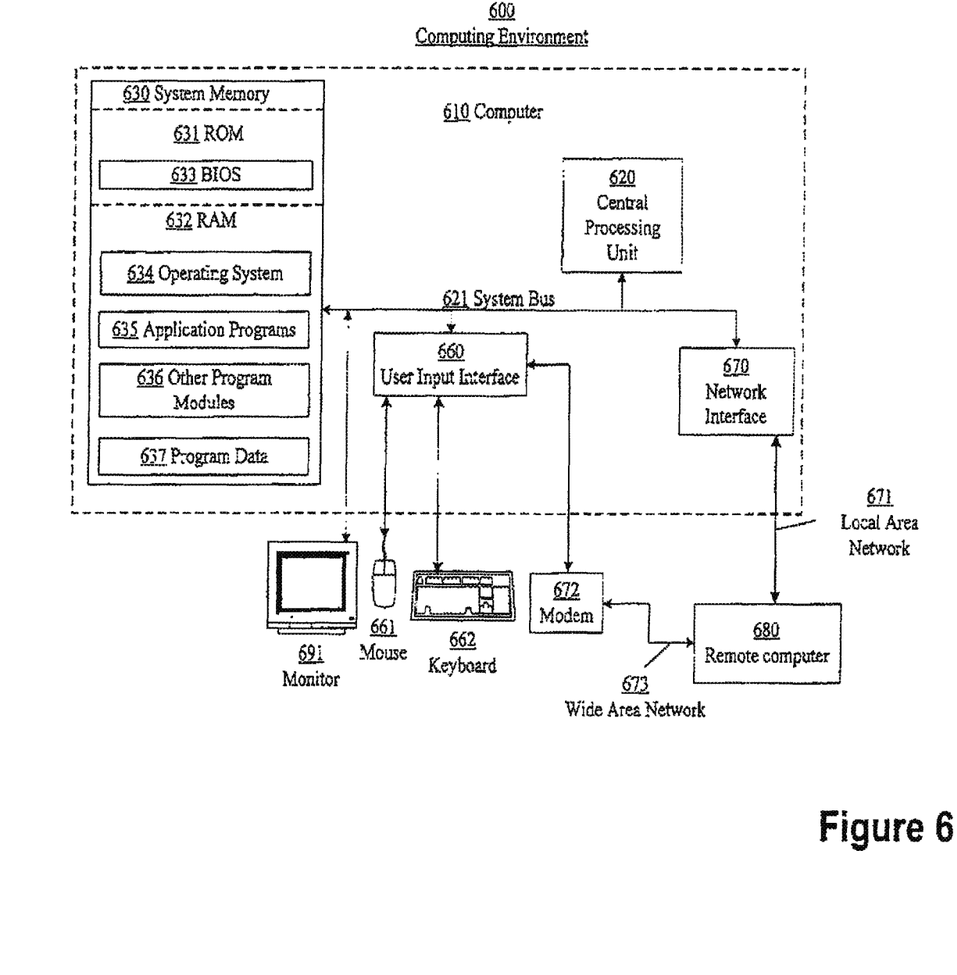
FIG. 6 depicts an example computing environment on which an example embodiment of a configuration management system may be implemented.

FIG. 6 depicts an example computing environment 600 on which an example embodiment of a configuration management system may be implemented. The computing environment 600 may include a computer 610, a monitor 691, and other input or output devices such as a mouse 661, a keyboard 662, and a modem 672. Components of the computer 610 may include a central processing unit 620, a system memory 630, and a system bus 621 that couples various system components including the system memory 630 to the central processing unit 620.

The system memory 630 may include computer storage media in the form of volatile and/or nonvolatile memory such as ROM 631 and RAM 632. A basic input/output system 633 (BIOS) containing basic routines that help to transfer information between elements within computer 610, such as during start-up, may be stored in ROM 631. RAM 632 typically contains data and/or program modules that are immediately accessible to and/or presently being operated on by the central processing unit 620. The system memory 630 additionally may include, for example, an operating system 634, application programs 635, other program modules 636, and program data 637.

Embodiments may be implemented in the computing environment 600 in the form of any of a variety of computer readable media. Computer readable media can be any media that can be accessed by computer 610, including both volatile and nonvolatile, removable and non-removable media.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610. The logical connections depicted in FIG. 6 include a local area network (LAN) 671 and a wide area network (WAN) 673, but may also include other networks. Such networking environments may be common in offices, enterprise-wide computer networks, intranets, and the Internet.

When used in a LAN networking environment, the computer 610 may be connected to the LAN 671 through a network interface 670. When used in a WAN networking environment, the computer 610 may include a modem 672 for establishing communications over the WAN 673, such as the Internet. The modem 672 may be connected to the system bus 621 via the user input interface 660, or other appropriate mechanism.

A computer 610 or other client device can be deployed as part of a computer network. In this regard, the disclosed embodiments pertain to any computer system having any number of memory or storage units, and any number of applications and processes occurring across any number of storage units or volumes. An embodiment may apply to an environment with server computers and client computers deployed in a network environment, having remote or local storage. The disclosed embodiments may also apply to a standalone computing device, having programming language functionality, interpretation and execution capabilities.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A system having a computing device including a processor and a memory communicatively coupled with the processor, the system configured to:

determine relationships among data sources and their associated business processes, wherein the associated business processes are associated with an information technology network and the determined relationships include a hierarchical dependency relationship that is determined via interconnectivity of the information technology network;

create a baseline image of the relationships and the data sources;

create a subsequent image of the relationships and the data sources;

compare the baseline image and the subsequent image to determine an image difference;

identify at least one unmanaged change based on the image difference, wherein the unmanaged change includes an indication that a first data source was added;

identify an associated business process that is impacted by addition of the first data source;

create a visual representation illustrating the relationships among data sources and their associated business processes;

trend a first incident related to the first data source, wherein the trended incident is used to perform maintenance for the information technology network; and reconcile the first data source according to requirements of the associated business process.

2. The system of claim 1, wherein the system is further configured to:

receive an indication of a modification to a second data source, wherein the modification of the second data source includes an upgrade of the second data source;

identify a second associated business process that is impacted by the modification of the second data source; and trend a second incident related to the second data source, wherein the second trended incident is used to perform further maintenance for the information technology network.

3. The system of claim 2, wherein the modification of the second data source includes adding hardware to the information technology network.

4. The system of claim 2, wherein the modification of the second data source includes making a software change to the information technology network.

5. The system of claim 1, wherein the visual representation is a hierarchical representation.

6. The system of claim 1, wherein reconciling includes determining a relevancy of the first data source among the data sources with respect to the requirements of the associated business process.

7. A computer implemented method comprising:

determining relationships among data sources and their associated business processes, wherein the associated business processes are associated with an information technology network and the determined relationships include a hierarchical dependency relationship that is determined via interconnectivity of the information technology network;

storing the relationships among the data sources in a federated database;

creating a baseline image of the relationships and the data sources;

creating a subsequent image of the relationships and the data sources;

comparing the baseline image and the subsequent image to determine an image difference;

identifying at least one unmanaged change based on the image difference, wherein the unmanaged change includes an indication that a first data source was added;

identifying an associated business process that is impacted by addition of the first data source;
creating a visual representation illustrating the relationships among data sources and their associated business processes;
trending a first incident related to the first data source, wherein the trended incident is used to perform maintenance for the information technology network; and
reconciling the first data source according to requirements of the associated business process.

8. The method of claim 7, the method further comprising:
receiving an indication of a modification to a second data source, wherein receiving the modification of the second data source includes receiving an upgrade of the first data source;
identifying a second associated business process that is impacted by the modification of the second data source; and
trending a second incident related to the second data source, wherein the second trended incident is used to perform further maintenance for the information technology network.

9. The method of claim 8, at least the first data source and second data source are arranged according to a federated configuration.

10. The method of claim 8, wherein receiving the modification of the second data source includes making a software change to the information technology network.

11. The method of claim 7, wherein creating the visual representation includes creating a hierarchical representation.

12. The method of claim 7, wherein reconciling includes determining a relevancy of the first data source among the data sources with respect to the requirements of the associated business process.

13. A non-transitory computer-readable storage medium including computer-readable instructions to:
determine relationships among data sources and their associated business processes, wherein the associated business processes are associated with an information technology network and the determined relationships include a hierarchical dependency relationship that is determined via interconnectivity of the information technology network;
store the relationships in a federated database;
create a baseline image of the relationships and the data sources;
create a subsequent image of the relationships and the data sources;
compare the baseline image and the subsequent image to determine an image difference;
identify at least one unmanaged change based on the image difference, wherein the unmanaged change includes an indication that a first data source was added;
identify an associated business process that is impacted by addition of the first data source; and
reconcile the first data source according to requirements of the associated business process.

14. The computer-readable storage medium of claim 13, wherein the storage medium further includes computer-readable instructions to:
receive an indication of a modification to a second data source, wherein the modification of the first data source includes an upgrade of the first data source;
identify a second associated business process that is impacted by the modification of the second data source; and
trend a second incident related to the second data source, wherein the second trended incident is used to perform further maintenance for the information technology network.

15. The computer-readable storage medium of claim 14, wherein the modification of the second data source includes adding hardware to the information technology network.

16. The computer-readable storage medium of claim 14, the federated database including a schema to define at least one table, two or more fields in the at least one table, and one or more schema relationships between the two or more fields.

17. The computer-readable storage medium of claim 13, the computer readable instructions further create a visual representation illustrating the relationships among data sources and their associated business processes, wherein the visual representation is a hierarchical representation.

18. The computer readable storage medium of claim 13, wherein reconciling includes determining a relevancy of the first data source among the data sources with respect to the requirements of the associated business process.

19. The method of claim 10, further comprising:
attaching a change record related to the software change.

* * * * *

UNITED STATES PATENT AND TRADEMARK OFFICE
CERTIFICATE OF CORRECTION

PATENT NO.         : 10,380,079 B1
APPLICATION NO.    : 14/199600
DATED              : August 13, 2019
INVENTOR(S)        : Mark C. Blazek and Richard C. Gonzalez Page 1 of 1

It is certified that error appears in the above-identified patent and that said Letters Patent is hereby corrected as shown below:

On the Title Page

Item (73):
SHOULD READ AS:
Assignee: United Services Automobile Association

In the Specification

Cross Reference To Related Applications (1st Paragraph):
SHOULD READ AS:
This application is a continuation of 13/302,141 filed Nov. 22, 2011, now Patent No. 8,706,682 which is a continuation of U.S. patent application Ser. No. 13/011,494, filed on Jan. 21, 2011, which is a continuation of U.S. patent application Ser. No. 11/321,307, filed Dec. 29, 2005, the specification of which is incorporated herein by reference. This application is also related in subject matter to, and incorporates herein by reference in its entirety, each of the following: U.S. patent application Ser. No. 11/321,333, filed on Dec. 29, 2005; U.S. patent application Ser. No. 11/321,335, filed on Dec. 29, 2005; and U.S. patent application Ser. No. 11/320,999 filed on Dec. 29, 2005.

Signed and Sealed this
Fifth Day of November, 2019

Andrei Iancu
*Director of the United States Patent and Trademark Office*